United States Patent
McDermott et al.

(10) Patent No.: US 6,670,413 B1
(45) Date of Patent: Dec. 30, 2003

(54) THIXOTROPIC CATALYST FOR CONDENSATION CURE SILOXANE MATERIALS

(76) Inventors: Phillip J. McDermott, 11506 Hunters Hawk Dr., Richmond, VA (US) 23938; Richard A. Striker, 3501 Stoney Ridge Rd., Richmond, VA (US) 23112

( * ) Notice: Subject to any disclaimer, the term of this patent is extended or adjusted under 35 U.S.C. 154(b) by 0 days.

(21) Appl. No.: 10/162,237

(22) Filed: Jun. 5, 2002

(51) Int. Cl.⁷ .......................... C08K 5/541; C08G 77/16; C08G 77/26; C08G 77/08
(52) U.S. Cl. .......................... 524/266; 528/17; 528/34; 528/38; 528/18; 524/268
(58) Field of Search .............................. 528/17, 18, 34, 528/38, 37; 524/266, 268

(56) References Cited

U.S. PATENT DOCUMENTS

| | | | | |
|---|---|---|---|---|
| 4,508,842 A | * | 4/1985 | Beran et al. ................ | 502/112 |
| 4,927,898 A | * | 5/1990 | King et al. .................... | 528/27 |
| 5,663,222 A | * | 9/1997 | Gay et al. ..................... | 524/99 |
| 6,265,496 B1 | * | 7/2001 | Priou et al. ................. | 525/477 |
| 6,339,137 B1 | * | 1/2002 | Biggs et al. ................. | 528/14 |

OTHER PUBLICATIONS

Technical Information Bulletin for Uvasil 299HM.*

* cited by examiner

Primary Examiner—Robert Dawson
Assistant Examiner—Marc S Zimmer
(74) Attorney, Agent, or Firm—Williams Mullen, PC

(57) ABSTRACT

The present invention relates generally to condensation cure moldmaking compositions that produce useful, curable molds and/or coatings that can be sprayed, trowled or poured, and to a method of making said molds. More particularly, the present invention relates to the use of hindered amine siloxanes to create a desirable thixotropy and cure rate in said moldmaking applications as compared to current technologies.

8 Claims, No Drawings

THIXOTROPIC CATALYST FOR CONDENSATION CURE SILOXANE MATERIALS

CROSS REFERENCE TO RELATED APPLICATION

This application claims the benefit of U.S. Provisional Application No. 60/295675 filed in the United States Patent Office on Jun. 4, 2001.

BACKGROUND OF THE INVENTION

1. Technical Field of the Invention

The present invention relates generally to condensation cure moldmaking compositions that produce useful, curable molds and/or coatings that can be sprayed, trowled or poured, and to a method of making said molds. More particularly, the present invention relates to the use of hindered amine siloxanes to create a desirable thixotropy and cure rate in said moldmaking applications as compared to current technologies.

2. Discussion of the Related Art

Curable silicone coating compositions are well known. U.S. Pat. No. 4,460,712 describes rapid cure compositions including aminofunctional silicone compositions or silicones having alkyl radicals bearing one or more amino groups that produce curable foams and coatings. The reactive silicon group is a polyorganosiloxane that is combined with an amino functional polymer to form a silicone foam, but does not disclose or teach enhancement of thixotropic character or moldmaking.

Silicone based condensation curing mechanisms are well known to those skilled in the art, and generally involve reactions between reactants such as silanol (Si—OH) and siliconhydride (Si—H) groups; between silanol and hydrolyzable or condensable silyl groups, such as Si—OC(O)CH$_3$ or Si—NR$_2$, etc.; between a hydrolyzable or condensable group and a polyhydric species, such as polyamines, polyalcohols, and the like. One example of this cure system is the reaction between two polymers, one may be organic and the other may be a siloxane polymer, bearing hydrolyzable or condensable groups attached directly to silicon atom(s).

Divalent tin compounds are the most preferred condensation catalysts as described in U.S. Pat. No. 4,954,565. As taught in the art, when said condensation catalysts are used, they are added in an amount preferably from 0.01 to 20 weight parts, more preferably from 0.1 to 5 weight parts, per 100 weight parts of the silicon modified organic polymer.

Typically, silicone compositions used for moldmaking are very flowable exhibiting Newtonian-like character. Block and glove molding are the two most popular types of moldmaking in the industry. A master, or an original, is placed in a container and the catalyzed silicone is then poured over the part. The silicone is then allowed to cure after which time the original part is removed. The silicone mold is then used for reproduction of the original part. For large parts, use of the above discussed condensation cure related art for this process has severe limitations. Typically an additive for the silicone is used to make the material thixotropic, or non-flowable, so that the large part can be sprayed with the silicone or to allow for the material to be trowled onto the original.

The present invention addresses deficiencies in the current art including: undesirable changes to the cure profile, residue on the surface of the reproductions and lack of thixotropic character preventing the use of very thick layers to prepare the mold.

The present invention represents several significant advances in the art. Even though the art teaches means for producing curable silicone compositions, it does not disclose compositions with high thixotropic character or an application of the same to moldmaking.

Accordingly, it is the object of the present invention to provide a means for reducing the minimum volume of material necessary to cure silicon molds, as well as, a method wherein the curing cycle is substantially reduced.

Additional objects and advantages of the present invention are apparent from the specification, which follows.

SUMMARY OF THE INVENTION

According to the present invention, the foregoing and additional objects are obtained by providing a trowlable or sprayable condensation curable silicone moldmaking composition with thixotropic character that cures to a stable silicone mold.

BRIEF DESCRIPTION OF THE DRAWINGS

No drawings are included.

DETAILED DESCRIPTION

Although there are several embodiments that encompass the elements of the claimed invention, those shown by the written description herein represent the preferred embodiments of the present invention and are exemplary thereof and are not intended by the inventors to constitute a limitation of the same.

The present invention is a silicon compound having the formula R$_3$SiOQ$_n$SiR$_3$, wherein:

R is a monovalent hydrocarbon radical,

Q is a siloxane having one or more radicals bearing one or more amino groups, and n is 1–500.

In a preferred embodiment, R is CH$_3$,

Q is

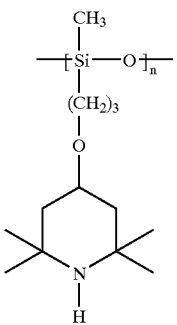

and n is 1.

The present invention relates to a composition comprising, in combination a base and a catalyst:

A. the blend of a base, hereinafter component (A):
  1. a silanol terminated polydimethylsiloxane;
  2. an extending filler;
  3. a reinforcing filler; and
  4. a trimethyl siloxy terminated polydimethylsiloxane; and B. the reaction product of a composition, hereinafter component (B):

1. an organometallic condensation catalyst;
2. an alkoxy silane;
3. a trimethylsilyl terminated polydimethylsiloxane; and
4. a cyclosiloxane piperidine.

In a preferred embodiment, the extending filler is alpha quartz and the reinforcing filler is amorphous silica. Also, in a preferred embodiment, the organometallic condensation catalyst is an organometallic tin compound; preferably a beta-diketonate tin compound or an alkyl tin carboxylate. The alkoxy silane is a di-, tri- or tetra alkoxy silane, preferably ethyl silicate.

The resulting compound (C) hindered amine siloxane is an organo silicon resin essentially of $R_3SiOQ_nSiR_3$, wherein R represents a monovalent hydrocarbon radical, such as methyl, ethyl, butyl, propyl and the like, and Q is a siloxane having alkyl radicals bearing one or more amino groups.

In the most preferred practice of this invention, component (A) is synthesized by mixing, at a minimum, about 35 to about 70 weight parts of a silanol terminated polydimethylsiloxane, about 20 to about 40 weight parts. alpha quartz, about 10 to about 20 weight parts amorphous silica and sufficient trimethyl siloxy terminated polydimethylsiloxane to create a homogenous solution; and component (B) is synthesized by mixing about 1 weight part dibutyl tin dilaurate, about 5 weight parts ethyl silicate, about 12 weight parts trimethylsiyl terminated polydimethylsiloxane and about 2 weight parts of a cyclosiloxane piperidine.

The present invention is in the field of condensation cure chemistries wherein the curable silicone composition is comprised of the following:

(a) a di-silanol stopped linear polydimethylsiloxane having a viscosity ranging from about 3,000 to about 100,000 centipoise at 25C;

(b) a finely divided filler or mixtures thereof;

(c) a methyl stopped polydimethylsiloxane having a viscosity ranging from about 10 to about 400 centipoise at 25C;

(d) a methyl stopped polydimethylsiloxane having a viscosity ranging from about 400 to about 1000 centipoise at 25C; and (e) a hindered amine siloxane.

The present invention further provides for a curable silicone composition for making casting molds comprising:

(a) a silanol stopped hydrogen stopped polydimethylsiloxane having a viscosity ranging from about 3,000 to about 100,000 centipoise at 25C;

(b) a fumed silica having a surface area varying from 50 to 325 $m^2/g$;

(c) a precipitated silica wherein said precipitated silica has been treated with hexamethyldisilazane and wherein said hexamethyldisilazane treated precipitated silica has a surface area ranging from about 50 to 225 $m^2/g$;

(d) a methyl stopped polydimethylsiloxane having a viscosity ranging from about 10 to 1000 centipoise at 25C;

(e) a hindered amine siloxane.

The present invention further provides for a silicone composition for making casting molds comprising:

(a) a curable silicone composition, and (b) a hindered amine siloxane

By hindered amine siloxane it is meant herein a polyorganosiloxane substituted with at least one alkyl radical bearing at least one amino group. Said alkyl radical is bonded to a silicon atom by a Si—C bond. The term hindered amine siloxane as used herein is intended to encompass silicones having alkyl radicals bearing one or more amino group.

The present invention uses a catalyst to effect the reaction between the polymer and a crosslinking compound. The preferred catalyst is an organometallic catalyst. The organometallic catalysts are organotin compounds of carboxylic acids having from 2 to 20 carbon atom(s) and organotin halides. Specific examples of such organotin compounds suitable for the present invention are diorganotin dicarboxylates, in particular dibutyltin dilaurate and also including dibutyltindiacetate, dibutyltinbisneodecanoate, stannous octaote, stannous oxide, dibutyl tin dichloride and dibutyltinbis acetylacetonoate. However, other tin catalysts can also be utilized, such as a member selected from the class consisting of diacylstannoxane, acylhydroxystannoxane, monomethoxyacylstannanes, dihalostannoxane or halohydroxystannoxane.

EXAMPLES

The following examples are presented to further illustrate the compositions of this invention, but are not to be construed as limiting the invention, which is delineated in the appended claims. In the following examples, if not otherwise noted, compound (A) and compound (B) are synthesized according to the preferred practice as stated herein and the aforesaid cyclosiloxane piperidine used was Uvasil™ although commercially available substitutes are incorporated by reference.

EXAMPLE 1

Reaction of compound (A) and compound (B) with 0 weight parts of the cyclosiloxane piperidine produced flowable material of greater than 4 inches (Boeing flow jig) and having a cure cycle of 395 minutes.

EXAMPLE 2

Reaction of compound (A) and compound (B) with 2 weight parts of the cyclosiloxane piperidine (Uvasil™ 299HM-Great Lakes Chemical) produced non-flowable material of approximately 0.15" and having a cure cycle of 25 minutes.

EXAMPLE 3

Reaction of compound (A) and compound (B) with 1 weight part of the cyclosiloxane piperidine (Uvasil™ 299HM-Great Lakes Chemical) produced non-flowable material of approximately 0.25" and having a cure cycle of 38 minutes.

EXAMPLE 4

Reaction of compound (A) and compound (B) with 0.5 weight parts of the cyclosiloxane piperidine (Uvasil™ 299HM-Great Lakes Chemical) produced non-flowable material of approximately 0.40" and having a cure cycle of 57 minutes.

EXAMPLE 5

Reaction of compound (A) and compound (B) with 1 weight part of the cyclosiloxane piperidine (Uvasil™ 299LM-Great Lakes Chemical) produced non-flowable material of approximately 0.30" and having a cure cycle of 41 minutes.

The present invention provides a unique, useful, and reliable means for decreasing undesirable changes to the cure profile and residue on contact surfaces; and increasing thixotropic character of hindered amine siloxanes for mold-making. Many improvements, modifications, and additions will be apparent to the skilled artisan without departing from the spirit and scope of the present invention as described herein.

We claim:

1. A method for producing a silicone composition, said method comprising mixing together:
   (A) a base blend comprising:
      1. a silanol terminated polydimethylsiloxane;
      2. an extending filler;
      3. a reinforcing filler; and
      4. a trimethyl siloxy terminated polydimethylsiloxane; and
   (B) a reaction product of:
      1. an organometallic condensation catalyst;
      2. an alkoxy silane;
      3. a trimethylsilyl terminated polydimethylsiloxane; and
      4. a cyclosiloxane piperidine.

2. The method of claim 1 wherein said extending filler is alpha quartz.

3. The method of claim 1 wherein said reinforcing filler is amorphous silica.

4. The method of claim 1 wherein said organometallic condensation catalyst is an organometallic tin compound.

5. The method of claim 4 wherein said organometallic tin compound is selected from the group consisting of a beta-diketonate tin compound and an alkyl tin carboxylate.

6. The method of claim 1 wherein said alkoxy silane is selected from the group consisting of di-alkoxy silane, tri-alkoxy silane and tetra-alkoxy silane.

7. The method of claim 1 wherein said alkoxy silane is ethyl silicate.

8. The method of claim 1 wherein said silanol terminated polydimethylsiloxane is about 35 to about 70 weight parts of said compound, said alpha quartz is about 20 to about 40 weight parts of said compound, said amorphous silica is about 10 to about 20 weight parts of said compound, said trimethyl siloxy terminated polydimethylsiloxane is a sufficient amount necessary to create a homogenous solution; said organometallic condensation catalyst is about 1 weight part of said compound, said alkoxy silane is about 5 weight parts of said compound, said trimethylsiyl terminated polydimethylsiloxane is about 12 weight parts of said compound and said cyclicsiloxane piperidine is about 2 weight parts of said compound.

* * * * *